US011865916B2

(12) United States Patent
Kuehne

(10) Patent No.: US 11,865,916 B2
(45) Date of Patent: Jan. 9, 2024

(54) METHOD FOR OPERATING A DISPLAY DEVICE ARRANGED IN A MOTOR VEHICLE AND DISPLAY DEVICE FOR USE IN A MOTOR VEHICLE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/268,237

(22) PCT Filed: May 21, 2019

(86) PCT No.: PCT/EP2019/063016
§ 371 (c)(1),
(2) Date: Feb. 12, 2021

(87) PCT Pub. No.: WO2020/035184
PCT Pub. Date: Feb. 20, 2020

(65) Prior Publication Data
US 2021/0188088 A1     Jun. 24, 2021

(30) Foreign Application Priority Data

Aug. 13, 2018   (DE) .................... 10 2018 213 634.3

(51) Int. Cl.
*B60K 35/00*     (2006.01)
*B60K 15/00*     (2006.01)
(Continued)

(52) U.S. Cl.
CPC .......... *B60K 15/00* (2013.01); *G01C 21/3676* (2013.01); *G01S 19/39* (2013.01);
(Continued)

(58) Field of Classification Search
CPC ............ B60K 35/00; B60K 2370/1529; B60K 2370/165; B60K 2370/177;
(Continued)

(56) References Cited

U.S. PATENT DOCUMENTS 10,332,292 B1 * 6/2019 Arnicar ................. G01C 21/00
10,699,347 B1 * 6/2020 Slusar ................ G01C 21/3461
(Continued)

FOREIGN PATENT DOCUMENTS

CN      101784412 A      7/2010
CN      106536316 A      3/2017
(Continued)

OTHER PUBLICATIONS

International Search Report (Forms PCT/ISA/210; PCT/ISA/220; and PCT/ISA/237); dated Jul. 8, 2019, in International Patent Application No. PCT/EP2019/063016 (14 pages).
(Continued)

*Primary Examiner* — Jin Ge
(74) *Attorney, Agent, or Firm* — STAAS & HALSEY LLP

(57) ABSTRACT

During a journey using a motor vehicle, a virtual environment is displayed by use of a display device and additionally a virtual representation of a route layout located in front of the motor vehicle is also displayed by use of the display device within the virtual environment. The display device may be used in the motor vehicle.

17 Claims, 1 Drawing Sheet

(51) Int. Cl.
*G01C 21/36* (2006.01)
*G01S 19/39* (2010.01)
*G06T 3/40* (2006.01)
*G06T 11/00* (2006.01)
*A63F 13/803* (2014.01)

(52) U.S. Cl.
CPC ............... *G06T 3/40* (2013.01); *G06T 11/00* (2013.01); *A63F 13/803* (2014.09); *A63F 2300/8017* (2013.01); *B60K 2370/1529* (2019.05); *B60K 2370/165* (2019.05); *B60K 2370/166* (2019.05); *B60K 2370/175* (2019.05); *B60K 2370/177* (2019.05)

(58) Field of Classification Search
CPC ........ B60K 2370/175; B60K 2370/166; G01C 21/3676; G01S 19/39; G06T 3/40; G06T 11/00; A63F 13/803; A63F 2300/8017
USPC .......................................................... 345/629
See application file for complete search history.

(56) References Cited

U.S. PATENT DOCUMENTS

| | | | | |
|---|---|---|---|---|
| 2003/0142115 | A1* | 7/2003 | Endo ...................... | G09B 29/10 345/633 |
| 2009/0198442 | A1* | 8/2009 | Takagi .................. | G09B 29/102 701/533 |
| 2013/0293582 | A1* | 11/2013 | Ng-Thow-Hing ... | G01C 21/365 345/633 |
| 2013/0322665 | A1* | 12/2013 | Bennett ............... | G01C 21/3617 381/300 |
| 2015/0100179 | A1* | 4/2015 | Alaniz .................. | G02B 27/017 701/1 |
| 2016/0148418 | A1* | 5/2016 | Cooper .................. | G06T 19/00 348/51 |
| 2017/0236328 | A1* | 8/2017 | Eatedali ............. | G01C 21/3697 345/633 |
| 2018/0040163 | A1* | 2/2018 | Donnelly ................ | G06F 3/017 |
| 2018/0089900 | A1 | 3/2018 | Rober et al. | |
| 2018/0154860 | A1* | 6/2018 | Thieberger .......... | B60R 21/0136 |
| 2018/0211414 | A1* | 7/2018 | Cronin ................ | B60W 40/105 |
| 2018/0270542 | A1* | 9/2018 | Ramalingam ...... | H04N 21/4858 |
| 2018/0357836 | A1* | 12/2018 | Ishiguro .................. | G06F 3/011 |
| 2019/0130878 | A1* | 5/2019 | Bradley ............... | G01C 21/365 |
| 2019/0179331 | A1* | 6/2019 | Heo .................... | G01C 21/3644 |
| 2019/0180485 | A1* | 6/2019 | Kim ........................ | G06T 11/60 |
| 2020/0173804 | A1* | 6/2020 | Zeng .................. | G01C 21/3602 |

FOREIGN PATENT DOCUMENTS

| | | |
|---|---|---|
| CN | 108136911 A | 6/2018 |
| DE | 10 2011 121 948 A1 | 6/2013 |
| DE | 10 2013 110 852 A1 | 4/2015 |
| DE | 11 2013 002 354 T5 | 4/2015 |
| DE | 10 2014 201 282 A1 | 7/2015 |
| DE | 10 2014 211 803 A1 | 12/2015 |
| DE | 10 2014 214 516 A1 | 1/2016 |
| DE | 10 2015 003 948 A1 | 9/2016 |
| DE | 10 2015 204 967 A1 | 9/2016 |
| DE | 10 2015 213 979 A1 | 1/2017 |
| DE | 10 2017 200 733 A1 | 7/2018 |
| EP | 2 762 950 A1 | 8/2014 |
| WO | 2019/089554 A1 | 5/2019 |

OTHER PUBLICATIONS

Examination Report dated May 9, 2019, in German Patent Application No. 10 2018 213 634.3 (10 pages).
International Patent Application No. PCT/EP/2019/063016, filed May 21, 2019, Marcus Kuehne, Audi AG.
German Patent Application No. 10 2018 2013 634.3, filed Aug. 13, 2018, Marcus Kuehne, Audi AG.
Written Opinion of the International Searching Authority (Form PCT/ISA/237); dated Jul. 8, 2019, in International Patent Application No. PCT/EP2019/063016 (14 pages including translation).
Notification of Transmittal of Translation of the International Preliminary Report on Patentability (Form PCT/IB/338) dated Feb. 25, 2021, in International Patent Application No. PCT/EP2019/063016 (1 page).
International Preliminary Report on Patentability (Form PCT/IB/373) dated Feb. 16, 2021, in International Patent Application No. PCT/EP2019/063016 (1 page).
Chinese Office Action issued in parallel Chinese Application No. 201980052655.4 dated Oct. 10, 2023.

* cited by examiner

METHOD FOR OPERATING A DISPLAY DEVICE ARRANGED IN A MOTOR VEHICLE AND DISPLAY DEVICE FOR USE IN A MOTOR VEHICLE

CROSS-REFERENCE TO RELATED APPLICATIONS

This application is a U.S. national stage of International Application No. PCT/EP2019/063016, filed on May 21, 2019. The International Application claims the priority benefit of German Application No. 10 2018 213 634.3 filed on Aug. 13, 2018. Both the International Application and the German Application are incorporated by reference herein in their entirety.

BACKGROUND

Described herein is a method for operating a display device arranged in a motor vehicle and a display device for use in a motor vehicle.

In the future, offerings will very likely become available or standard in vehicles from the increased use of autonomous driving options, in which vehicle occupants can experience various virtual experiences while wearing augmented reality glasses or virtual reality glasses. Possibilities could also exist, for example, of working very normally in a vehicle and at the same time having various types of virtual environments, for example a virtual working area, displayed by use of large display areas in a vehicle. It could also become possible to interact with persons located outside the vehicle or to interact with virtual representations of these persons, for example in the form of avatars. In the above-mentioned usage scenarios, the theme of avoiding kinetosis, for example in the form of simulator sickness, can play a very significant role.

German Patent Application No. 10 2015 204 967 A1 describes a method for assisting a driver of a vehicle on a driving track, for example on a racetrack. A graphic representation of a course of a track section can be output by use of data glasses, in order to thus signal, for example, optimum braking points before approaching curves.

German Patent Application No. 10 2014 201 282 A1 describes a driver assistance system which includes an autopilot function. A future lateral control by the autopilot of the vehicle is displayed on a display device.

German Patent Application No. 10 2013 110 852 A1 describes a driver assistance system used for automatic control of a vehicle. A future driving maneuver of the driver assistance system is displayed here by use of a display device in the vehicle.

SUMMARY

One or more aspects of the disclosure provide a solution, by use of which the occurrence of kinetosis can be prevented or the risk of an occurrence of kinetosis can be at least substantially reduced during the display of virtual environments within a motor vehicle.

This may be achieved by a method for operating a display device arranged in a motor vehicle and by a display device for use in a motor vehicle having features described herein. Advantageous embodiments having expedient and non-trivial refinements are also further described herein.

In the method described herein for operating a display device arranged in a motor vehicle during a journey using the motor vehicle, a virtual environment is displayed by use of the display device. In addition, a virtual representation of a route layout located in front of the motor vehicle is also displayed by use of the display device within the virtual environment. The route layout can be ascertained, for example, on the basis of provided digital map data. For example, the motor vehicle can include a permanently installed navigation system in which these digital map data are stored. It is also possible that the motor vehicle itself does not provide these digital map data at all, for example, wherein in this case, for example, these digital map data can be provided by use of a smart phone and can be transmitted to the display device.

The disclosure is based on the fundamental finding that a harmonization of movements of the motor vehicle and displayed virtual environments can contribute to preventing kinetosis, for example so-called simulator sickness, or at least substantially reducing the risk of the occurrence of kinetosis. It is thus conceivable, for example, that the virtual environment enables a vehicle occupant looking at the display device to be located, for example, virtually on a platform which slides on virtual rails through a virtual environment. It is possible by use of the method described herein that the display by use of the display device is carried out so that the vehicle occupant can already surmise which real movements of the motor vehicle are imminent next, so that he can adjust mentally to the coming intrinsic movement of the motor vehicle. This is implemented in that the virtual representation of the route layout located in front of the motor vehicle is additionally also displayed within the virtual environment by use of the display device.

Because the route layout located in front of the motor vehicle is displayed by use of the display device within the virtual environment, the relevant vehicle occupant can not only surmise how the motor vehicle and thus he himself will actually move in reality, but rather he also receives a type of visual feedback on the actual intrinsic movement of the motor vehicle via the overlaid route layout. This can also contribute to preventing kinetosis or at least significantly reducing the occurrence of this phenomenon.

One advantageous embodiment described herein provides that the virtual representation of the route layout located in front of the motor vehicle is displayed in a predetermined scale, wherein a virtual position of a vehicle occupant who uses the display device changes within the virtual environment in accordance with a real position change of the motor vehicle. For example, a car race game or a flight with a space glider can be displayed by use of the display device, wherein the relevant vehicle occupant is immersed completely in the virtual environment by use of the display device, for example, in that the display device is virtual reality glasses worn by the vehicle occupant, for example. The route layout located in front of the motor vehicle is displayed here, for example, in the scale 1:1 within the virtual environment, for example in the form of a route layout of a displayed virtual route. Other scales can also be specified, of course. The vehicle occupant wearing the virtual reality glasses can thus recognize easily how the motor vehicle will move in reality due to the route layout still located in front of the motor vehicle, even if the vehicle occupant is completely visually closed off from reality, for example while wearing virtual reality glasses. Of course, this procedure is not only limited to the use of virtual reality glasses. For example, the vehicle occupant can also wear augmented reality glasses, wherein it is also conceivable that the display device can be a vehicle-fixed display device in the form of a display, a head-up display, or the like.

A further advantageous embodiment described herein provides that the virtual representation of the route layout located in front of the motor vehicle is overlaid in the form of a representation reduced in size. For example, it is possible that the virtual representation of the route layout located in front of the motor vehicle is overlaid in the form of a map representation reduced in size. The actually displayed virtual environment is thus not further impaired by the representation reduced in size of the route layout located in front of the motor vehicle. Nonetheless, the relevant vehicle occupant who looks at the display device can easily recognize on the basis of the representation reduced in size, for example in the form of the map representation, what type of a route layout is still located in front of the motor vehicle and how the motor vehicle and thus also the vehicle occupant will move accordingly in reality. In this way, the relevant vehicle occupant also receives a visual indication of how the motor vehicle will still move in the further driving route. This can also counteract the occurrence of kinetosis.

In a further advantageous embodiment described herein, it is provided that the virtual representation of the route layout located in front of the motor vehicle is displayed faithfully to a curve and height profile of the real route layout. For example, corresponding digital map data can be provided, on the basis of which items of information or data on the curve and height profile of the route layout located in front of the motor vehicle are provided. The vehicle occupant who looks at the relevant display device in the motor vehicle can thus very accurately recognize and estimate on the basis of the curve and height profile of the route layout located in front of the motor vehicle how the motor vehicle will move in future in reality. The vehicle occupant can thus estimate which movements of the motor vehicle are imminent next and thus adjust mentally to the coming intrinsic movement, which also counteracts the occurrence of kinetosis.

According to a further advantageous embodiment described herein, it is provided that a locomotion of the motor vehicle is ascertained by use of a satellite-based registration device of the motor vehicle, for example by use of a GPS sensor, and the ascertained locomotion of the motor vehicle is identified by use of the display device. In that the locomotion of the motor vehicle is also identified within the virtual environment by use of the display device, the relevant vehicle occupant receives a good reference point for the locomotion of the real motor vehicle. This can also contribute to counteracting kinetosis.

A further advantageous embodiment described herein provides that a moving virtual representation of the motor vehicle is overlaid and/or a virtual perspective of the displayed virtual environment is changed in accordance with the ascertained locomotion of the motor vehicle. In the first mentioned case, for example, it can be provided that, for example, simply only an arrow representing the real motor vehicle is displayed within a map representation reduced in size, wherein this arrow moves along the route layout shown within the displayed map in accordance with the locomotion of the motor vehicle. It was already mentioned as an example before that it is conceivable that the vehicle occupant enjoys or consumes a virtual car game by use of the display device. In this case, it is conceivable that the virtual perspective on the displayed virtual environment in the form of the car race game is adapted in accordance with the real locomotion of the motor vehicle. For example, if the vehicle occupant wears virtual reality glasses, a virtual car race is thus displayed by use of these glasses, wherein the wearer of the virtual reality glasses, i.e., the relevant vehicle occupant, moves within the displayed virtual environment in the car race game as he does so in reality with the motor vehicle. In this case, the visual stimuli by the displayed virtual environment and the real locomotion registered by the equilibrium organ of the relevant vehicle occupant thus correspond very well with one another. This also contributes to counteracting kinetosis.

In a further advantageous embodiment described herein, it is provided that a virtual representation of a route layout already covered by use of the motor vehicle is displayed by use of the display device within the virtual environment. Thus, for example, the changing real ego position of the motor vehicle within the virtual environment can be displayed, wherein a part of the covered route layout and also a route layout located in front of the motor vehicle are always displayed within the virtual environment by use of corresponding virtual representations. This also contributes to counteracting kinetosis.

The display device described herein for use in a motor vehicle is designed to display a virtual environment and additionally also a virtual representation of a route layout located in front of the motor vehicle within the virtual environment. Advantageous embodiments of the method described herein are to be considered advantages and advantageous embodiments of the display device described herein and vice versa, wherein the display device for example includes features for carrying out the method operations.

One advantageous embodiment of the display device provides that the display device is virtual reality glasses, augmented reality glasses, an augmented reality contact lens, or a vehicle-side display device.

It is possible by use of the display device to offer various virtual experiences during the journey with the motor vehicle, in which corresponding virtual environments are displayed. A vehicle occupant can thus experience a virtual space battle by use of the display device, for example. It is also possible that the display device is used for work, so that, for example, a virtual work environment is displayed, within which the vehicle occupant can interact with further persons, who are either seated in the same vehicle or, for example, are also wearing virtual reality glasses at an entirely different location. It is thus possible by use of the display device to interact with greatly varying persons within the displayed virtual environment, for example in that avatars of the further persons are displayed within the virtual environment. Because in addition at least the virtual representation of the route layout located in front of the motor vehicle can also be displayed by use of the display device within the virtual environment, it is possible to avoid the user of the display device feeling sick during the journey with the motor vehicle, i.e. kinetosis occurring, for example in the form of simulator sickness.

Further advantages, features, and details described herein result from the following description of example embodiments and on the basis of the drawings. The features and feature combinations mentioned above in the description and the features and feature combinations mentioned hereinafter in the description of the drawings and/or shown solely in the drawings are usable not only in the example specified combinations, but also in other combinations or alone, without leaving the scope of the disclosure.

BRIEF DESCRIPTION OF THE DRAWINGS

These and other aspects and advantages will become more apparent and more readily appreciated from the following description of the example embodiments, taken in conjunction with the accompanying drawings, in which.

DETAILED DESCRIPTION

Figure 1:
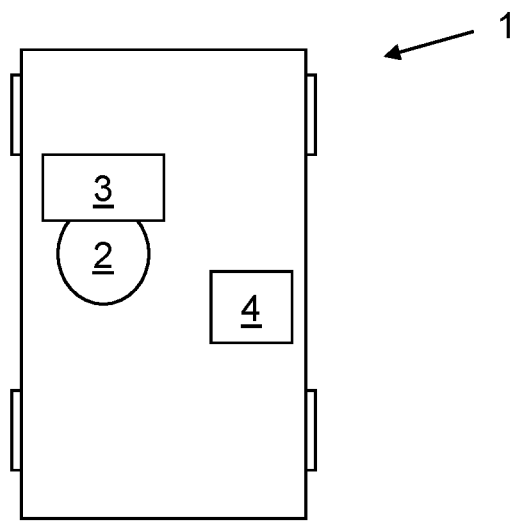
FIG. 1 is a schematic illustration of a motor vehicle in which a vehicle occupant is seated who is wearing virtual reality glasses.

In the drawings, identical reference characters each identify functionally-identical elements.

A motor vehicle 1 is shown in a schematic illustration in FIG. 1. A vehicle occupant 2, who is wearing virtual reality glasses 3, is seated in the motor vehicle 1. The motor vehicle 1 moreover also includes a satellite-based registration device 4, by use of which a position of the motor vehicle 1 can be ascertained or registered progressively. The registration device 4 can be, for example, part of a navigation system (not shown in greater detail) of the motor vehicle 1 or can simply be only a GPS sensor. The explanations presented hereinafter in conjunction with the virtual reality glasses 3 also apply for the case that the vehicle occupant 2 uses augmented reality glasses, augmented reality contact lenses, or vehicle-side display devices instead of the virtual reality glasses 3.

During the journey with the motor vehicle 1, a virtual environment is displayed by use of the virtual reality glasses 3. In addition, a virtual representation of a route layout located in front of the motor vehicle 1 is also displayed by use of the virtual reality glasses 3, so that the vehicle occupant 2 can adjust to the still imminent intrinsic movements of the motor vehicle 1 due to the route layout located in front of the motor vehicle 1. Kinetosis in the vehicle occupant 2 is thus counteracted, for example simulator sickness may be avoided. The kinetosis can result if greater discrepancies result between visual stimuli and feedback of the equilibrium organ. This can be the case if the vehicle occupant 2 moves differently virtually within the displayed virtual environment, for example, than he does in reality due to the intrinsic movement of the motor vehicle 1.

Figure 2:
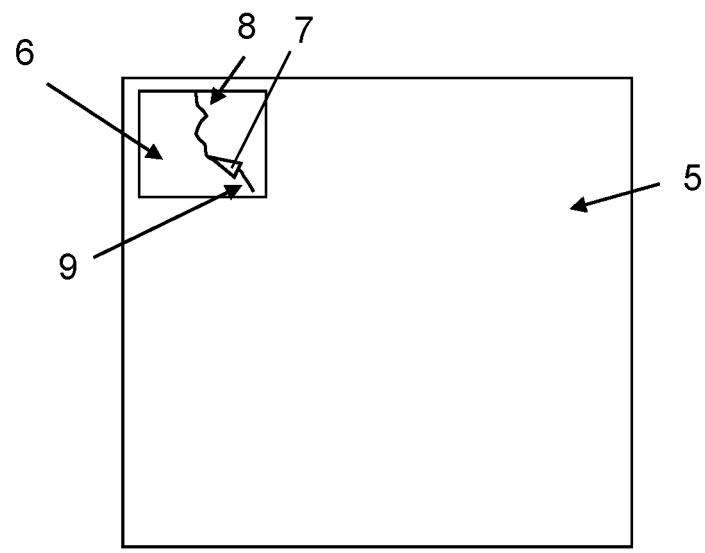
FIG. 2 is a schematic illustration of a virtual environment which is displayed by use of the virtual reality glasses, wherein a map representation is overlaid in a top left corner of the virtual environment, by use of which a route layout located in front of the motor vehicle is identified.

The virtual environment 5, which is displayed by use of the virtual reality glasses 3, is shown schematically in FIG. 2. A map representation 6 is overlaid in a top left corner of the virtual environment 5. A virtual representation of the motor vehicle 7—simply by the triangle in the present illustration—is overlaid in the map representation 6. Moreover, the route layout located in front of the motor vehicle 1 is also overlaid as a virtual representation 8 and an already covered route layout is also overlaid as a virtual representation 9. In the remaining display region of the virtual reality glasses 3, the vehicle occupant 2 can thus enjoy the overlaid virtual environment 5, wherein he receives an indication at all times by the map representation 6 of how the route layout located in front of the motor vehicle 1 is provided. The vehicle occupant 2, even when completely visually closed off from his environment, can thus adjust well to how the motor vehicle 1 and thus he himself will move in reality.

It is also conceivable that a curve and height profile of the real route layout located in front of the motor vehicle 1 is displayed by use of the virtual reality glasses 3. The vehicle occupant 2 can thus adjust particularly well to which lateral movements and which up-and-down movements he has to expect in reality due to the route layout still located in front of the motor vehicle 1. A locomotion of the motor vehicle 1 can be ascertained by use of the registration device 4, wherein the ascertained locomotion of the motor vehicle 1 can be identified by use of the virtual reality glasses 3 in the form of the moving triangle 7. It is also conceivable that the triangle 7 remains at the same position, wherein the representations 8, 9 of the route layout located in front of the motor vehicle 1 and the already covered route layout simply travel farther and farther in accordance with the real locomotion of the motor vehicle 1.

Contrary to the schematic illustration in FIG. 2, it is also possible that the virtual representation 8 of the route layout located in front of the motor vehicle 1 is displayed, for example, in the scale 1:1. Other scales—whether they are increases or decreases in size—are also possible. A virtual position of the vehicle occupant 2 who is wearing the virtual reality glasses 3 changes in this case within the displayed virtual environment 5 in accordance with his real position change, i.e., in accordance with the real position change of the motor vehicle 1. It is thus possible, for example, that a virtual car race is displayed by use of the virtual reality glasses 3, wherein the vehicle occupant 2 moves within the virtual car race precisely as he does so by use of the motor vehicle 1 within reality. A route layout of a virtual racetrack can be displayed, for example, so that the route layout of the overlaid virtual racetrack corresponds to the real route layout still located in front of the motor vehicle 1. The vehicle occupant 2, in spite of total visual shutoff from reality, can thus adjust particularly well to how the motor vehicle 1 will move in reality.

Instead of the virtual reality glasses 3, for example, augmented reality glasses or also augmented reality contact lenses can also be used. In this case, the vehicle occupant 2 can still perceive his real environment, wherein this can be overlaid at different strengths by virtual contents which form the virtual environment 5. It can also be reasonable in this case to identify the real route layout located in front of the motor vehicle 1 in the form of the virtual representation 8, so that the vehicle occupant 2 can adjust to the still imminent intrinsic movements of the motor vehicle 1. It is also conceivable that instead of the virtual reality glasses 3, greatly varying vehicle-side display devices, for example displays, head-up displays, contact-analog displays, and the like are used. By use of these display devices it is also possible to display the virtual environment 5, wherein a virtual representation 8 of the route layout located in front of the motor vehicle 1 is also displayed within the virtual environment 5 in this case, which induces the same or at least a similar effect, namely that kinetosis can be counteracted, since the vehicle occupant 2 can adjust to the still imminent real intrinsic movements of the motor vehicle 1.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of operating a display device disposed in a motor vehicle, the method comprising:
  displaying, using the display device, a first virtual environment in form of a first virtual representation in which an occupant of the motor vehicle is to move virtually within the first virtual representation differently than a moving motor vehicle along a real route layout located in front of the motor vehicle, the displaying the first virtual representation includes changing within the first virtual representation a virtual position of the occupant virtually moving within the first virtual representation in accordance with a real position change of the moving motor vehicle in the real route layout located in front of the motor vehicle; and while displaying the first virtual representation when the motor vehicle is moving, displaying, using the display device, by overlaying within the first virtual representation, a second virtual environment in form of a second virtual representation of the motor vehicle moving virtually along the real route layout located in front of the moving motor vehicle, so as to reduce or prevent kinetosis experienced by the occupant moving virtually within the first virtual representation in which the occupant moves virtually differently than the moving motor vehicle.

2. The method according to claim 1, wherein
the displaying the second virtual representation of the real route layout located in front of the moving motor vehicle includes displaying the second virtual representation in a determined scale.

3. The method according to claim 1, wherein the displaying the second virtual representation of the real route layout located in front of the moving motor vehicle includes overlaying the second virtual representation of the real route layout located in front of the moving motor vehicle within the first virtual representation in form of a representation reduced in size.

4. The method according to claim 3, wherein the second virtual representation of the real route layout located in front of the moving motor vehicle is overlaid in form of a map representation.

5. The method according to claim 1, wherein the displaying the second virtual representation of the real route layout located in front of the moving motor vehicle includes displaying the second virtual representation of the real route layout located in front of the moving motor vehicle so as to correspond to a curve and height profile of the real route layout located in front of the moving motor vehicle.

6. The method according to claim 1, further comprising:
determining a locomotion of the motor vehicle by using a satellite-based registration device of the motor vehicle; and
identifying, by the display device, the locomotion of the motor vehicle determined using the satellite-based registration device to virtually represent the motor vehicle in the second virtual representation of the real route layout located in front of the moving motor vehicle.

7. The method according to claim 6,
wherein to virtually represent the motor vehicle includes at least one overlaying of a virtual representation in form of:
a moving virtual representation of the motor vehicle based on the locomotion of the motor vehicle determined using the satellite-based registration device; or
changing a virtual perspective of the second virtual representation, based on the locomotion of the motor vehicle determined using the satellite-based registration device.

8. The method according to claim 1, further comprising:
while displaying the second virtual representation, displaying, using the display device, within the second virtual representation, a travelled virtual representation of a route layout already travelled by the motor vehicle.

9. A display device for use in a motor vehicle, the display device comprising:
a memory to store instructions; and
a processor configured to execute the instructions stored in the memory to:
display a first virtual environment in form of a first virtual representation in which an occupant of the motor vehicle is to move virtually within the first virtual representation differently than a moving motor vehicle along a real route layout located in front of the motor vehicle,
the displaying the first virtual representation includes changing within the first virtual representation a virtual position of the occupant virtually moving within the first virtual representation in accordance with a real position change of the moving motor vehicle in the real route layout located in front of the motor vehicle, and
while displaying the first virtual representation when the motor vehicle is moving, display within the first virtual representation, by overlaying within the first virtual representation, a second virtual environment in form of a second virtual representation of the motor vehicle moving virtually along the real route layout located in front of the moving motor vehicle, so as to reduce or prevent kinetosis experienced by the occupant which moving virtually within the first virtual representation in which the occupant moves virtually differently than the moving motor vehicle.

10. The display device according to claim 9, wherein the display device includes virtual reality glasses, augmented reality glasses, an augmented reality contact lens, or a vehicle-side display device.

11. The display device according to claim 9, wherein the processor is configured to execute the instructions stored in the memory to:
display the second virtual representation of the real route layout located in front of the moving motor vehicle by displaying the second virtual representation in a determined scale.

12. The display device according to claim 9, wherein the processor is configured to execute the instructions stored in the memory to:
perform the overlaying by displaying the second virtual representation of the real route layout located in front of the moving motor vehicle by overlaying the second virtual representation of the real route layout located in front of the moving motor vehicle within the first virtual representation in form of a representation reduced in size.

13. The display device according to claim 12, wherein the processor is configured to execute the instructions stored in the memory to:
overlay the second virtual representation of the real route layout located in front of the moving motor vehicle in form of a map representation.

14. The display device according to claim 9, wherein the processor is configured to execute the instructions stored in the memory to:
display the second virtual representation of the real route layout located in front of the moving motor vehicle by displaying the second virtual representation of the real route layout located in front of the moving motor vehicle so as to correspond to a curve and height profile of the real route layout located in front of the moving motor vehicle.

15. The display device according to claim 9, wherein the processor is configured to execute the instructions stored in the memory to:
   determine a locomotion of the motor vehicle by using a satellite-based registration device of the motor vehicle, and
   identify the locomotion of the motor vehicle determined using the satellite-based registration device to virtually represent the motor vehicle in the second virtual representation of the real route layout located in front of the moving motor vehicle.

16. The display device according to claim 15, wherein to virtually represent the motor vehicle includes at least one overlaying of a virtual representation in form of:
   overlay within the first virtual representation a moving virtual representation of the motor vehicle based on the locomotion of the motor vehicle determined using the satellite-based registration device, or
   change a virtual perspective of the second virtual representation, based on the locomotion of the motor vehicle determined using the satellite-based registration device.

17. The display device according to claim 9, wherein the processor is configured to execute the instructions stored in the memory to:
   while the second virtual representation is displayed, display within the second virtual representation, a traveled virtual representation of a route layout already travelled by the motor vehicle.

* * * * *